United States Patent [19]
Chen et al.

[11] Patent Number: 5,733,370
[45] Date of Patent: Mar. 31, 1998

[54] METHOD OF MANUFACTURING A BICRYSTAL CLUSTER MAGNETIC RECORDING MEDIUM

[75] Inventors: Ga-Lane Chen, Fremont; Qixu Chen, Milpitas, both of Calif.

[73] Assignee: Seagate Technology, Inc., Scotts Valley, Calif.

[21] Appl. No.: 586,529

[22] Filed: Jan. 16, 1996

[51] Int. Cl.$^6$ .................................................. C30B 23/06
[52] U.S. Cl. .......................... 117/105; 117/108; 117/939; 204/192.2; 204/192.32
[58] Field of Search ........................... 204/192.2, 192.32; 117/105, 108, 939

[56] References Cited

U.S. PATENT DOCUMENTS

| | | |
|---|---|---|
| 4,900,397 | 2/1990 | Werner et al. |
| 5,273,834 | 12/1993 | Hoover et al. |
| 5,302,434 | 4/1994 | Doemer et al. |

OTHER PUBLICATIONS

B.Y. Wong et al., "Investigation of CoNiCr Thin Films Deposited on [100]and [110] Cr Single Crystals," IEEE Transactions on Magnetics, vol. 27, No. 6, Nov. 1991, pp. 4733–4735.

M. Mirzamaani et al., "Magnetic properties of CoPtCr thin films with <1120> crystal orientation," J. Appl. Phys. 69 (8), Apr. 15, 1991, pp. 5169–5170.

T. Min et al., "Bicrystal advanced thin–film media for high density recording," J. Appl. Phys. 75 (10), May 15, 1994, pp. 6129–6131.

J. Ding et al., "Microstructure and Recording Properties of Bicrystal Disks with GaAs Substrates," IEEE Transactions on Magnetics, vol. 30, No. 6, Nov. 1994, pp. 3978–3980.

M. Futamoto et al., "Magnetic and Recording Characteristics of Bicrystalline Longitudinal Recording Medium Formed on an MgO Single Crystal Disk Substrate," IEEE Transactions on Magnetics, vol. 30, No. 6, Nov. 1994, pp. 3975–3977.

X. Ye et al., "Modeling of thin–film media with advanced microstructure for ultrahigh density recording," J. Appl. Phys. 75 (10), May 15, 1994, pp. 6135–6137.

T.P. Nolan et al., "Effect of microstructural features on media noise in longitudinal recording media," J. Appl. Phys. vol. 73, No. 10, May 15, 1993, pp. 5566–5568.

Q. Peng et al., "Micromagnetic and Experimental Studies of CoPtCr Bicrystal Thin Film Media," JA–01, Intermag Conference, San Antonio, Texas, Apr. 1995.

Y. Hosoe et al., "Bicrystal Cluster Structure and Magnetic Properties of CoCrTa/Cr Thin Film Media," JA–02, Intermag Conference, San Antonio, Texas, Apr. 1995.

J. Ding et al. "Fabrication and Recording Performances of Bicrystal Disks on GaAs Substrates," Journal of The Magnetics Society of Japan, vol 18, Supplement, No. S1 (1994).

Ding et al., "Experimental Study on Recording and Track Edge Characterisitcs of Bicrystal Thin Film Media," IEEE Trans. Magn., Mag-31, p. 2827, 1995.

*Primary Examiner*—Robert Kunemund
*Attorney, Agent, or Firm*—Lowe, Price, LeBlanc & Becker

[57] ABSTRACT

A magnetic recording medium comprising a magnetic alloy layer having a bicrystal cluster microstructure and, hence, reduced medium noise, is formed by depositing a seed layer on a glass or a glass-ceramic material substrate, oxidizing the seed layer, depositing an underlayer, such as chromium, on the oxidized seed layer, whereby the underlayer exhibits a (200) crystallographic orientation. A magnetic alloy epitaxially grown on the underlayer having a (200) crystallographic orientation exhibits a bicrystal cluster microstructure.

28 Claims, 3 Drawing Sheets

METHOD OF MANUFACTURING A BICRYSTAL CLUSTER MAGNETIC RECORDING MEDIUM

TECHNICAL FIELD

The present invention relates to a method of manufacturing a magnetic recording medium, such as a thin film magnetic recording disk. The invention has particularly applicability in manufacturing a low noise, high density, magnetic recording medium.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is schematically depicted in FIG. 1 and comprises a substrate 10, typically an aluminum (Al) alloy, such as an aluminum-magnesium (Al—Mg) alloy plated with a layer of amorphous nickel-phosphorous (NiP). Substrate 10 generally contains sequentially deposited thereon a chromium (Cr) underlayer 11, a cobalt (Co)-based alloy magnetic layer 12, a protective carbon overcoat 13 and a lubricant 14. Cr underlayer 11, Co-based alloy magnetic layer 12, and protective carbon overcoat 13 are typically deposited by sputtering techniques. The Co-based alloy magnetic layer typically comprises polycrystallites epitaxially grown on polycrystal Cr underlayers.

The conventional NiP plating on the Al-alloy substrate is provided primarily to increase the hardness of the Al-alloy substrate, thereby providing a suitable surface for polishing to provide the requisite surface roughness or texture. The NiP coating is typically applied by electroless plating to a thickness of about 15 micrometers.

Werner et al., U.S. Pat. No. 4,900,397, proposed the use of Radio Frequency (RF) sputter etching to remove surface deposits on a conventional NiP coating of Al-alloy substrates, followed by oxidization, to improve adhesion of a Cr underlayer. Doernet et al., U.S. Pat. No. 5,302,434, found it difficult to obtain high coercivity on superpolished untextured NiP coated substrates, and proposed annealing in air to form a nickel oxide film on the surface of the NiP plating for enhanced coercivity. The smooth surface of the polished NiP layer was maintained through subsequent layers. The nickel oxide film was also said to reduce modulation by altering the crystallographic orientation of the underlayer and magnetic layer.

Other substrate materials have been employed, such as glasses, e.g., an amorphous glass, and glass-ceramic materials which comprise a mixture of amorphous and crystalline materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

Magnetic films exhibiting a bicrystal cluster microstructure have been the subject of recent investigations, due to an expected high coercivity, low noise, and high remanent squareness. However, bicrystal cluster magnetic films have not proved to be commercially feasible. Wong et al. (IEEE Trans. Magn., MAG-27, p. 4733, 1991), Mirzamaani et al. (J. Appl. Phys., 69, p. 5169, 1991), Min and Zhu (J. Appl. Phys., 75, p. 6129, 1994), Ding and Zhu (IEEE Trans. Magn., MAG-30, p. 3978, 1994) and Futamoto et al. (IEEE Trans. Magn., MAG-30, p. 3975, 1994) successfully produced bicrystal media on single crystal substrates. Ye and Zhu employed computers to simulate a bicrystal structure (J. Appl. Phys., 75, p. 6135, 1994). However, the production of actual bicrystal cluster media corresponding to the computer generated ideal microstructure of Ye and Zhu has been elusive.

Bicrystal cluster structures were produced in Cr/Co alloys deposited on NiP coated Al substrates by Nolan et al. (J. Appl. Phys., 73, p. 5566, 1993), Peng et al. (JA-01, Intermag Conference, San Antonio, Tex., April 1995) and Hosoe et al. (JA-02, Intermag Conference, San Antonio, Tex., April 1995). See also Ding et al. "Fabrication and Recording Performances of Bicrystal Disks on GaAs Substrates", Journal of The Magnetics Society of Japan, Vol. 18, Supplement, No. S1 (1994) and Ding et al., "Experimental Study on Recording and Track Edge Characteristics of Bicrystal Thin Film Media", IEEE Trans. Magn., Mag-31, p. 2827, 1995. However, magnetic recording media comprising a bicrystal cluster microstructure have not achieved any practical utility in the marketplace, presumably due to costly single crystal substrates and complex production requirements.

In copending application U.S. Ser. No. 08/586,571 there is disclosed a magnetic recording medium comprising a glass or glass-ceramic substrate and exhibiting significantly reduced medium noise attributed to a magnetic alloy layer having a bicrystal cluster microstructure spitaxially grown on an underlayer having a (200) crystallographic orientation. The formation of a (200) orientation was achieved by depositing a seed layer on the glass or glass-ceramic substrate. In one embodiment, the surface of the seed layer was roughened.

There exists a need for a method of manufacturing a magnetic rigid disk medium for longitudinal recording with low medium noise and high coercivity comprising a magnetic alloy layer having bicrystal cluster media suitable for commercial applications in a cost-effective, efficient manner.

DISCLOSURE OF THE INVENTION

An object of the present invention is a method of manufacturing a thin film magnetic recording medium exhibiting low noise and high coercivity.

Another object of the present invention is a method of manufacturing a thin film magnetic recording medium comprising a magnetic layer having a bicrystal cluster microstructure.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a method of manufacturing a magnetic recording medium, which method comprises: depositing a seed layer on a substrate comprising a glass or a glass-ceramic material; oxidizing the seed layer; depositing an underlayer on the oxidized seed layer; and depositing a magnetic layer on the underlayer, wherein the deposited magnetic layer has a bicrystal cluster microstructure.

Additional objects and advantages of the present invention will become readily apparent to those skilled in this art wherein embodiments of the invention are exemplified simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
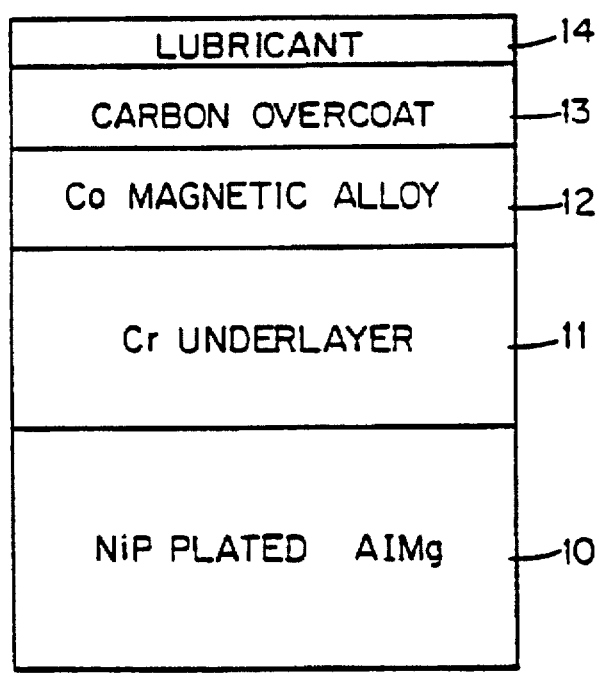
FIG. 1 schematically depicts a conventional magnetic recording medium structure.
Figure 2:
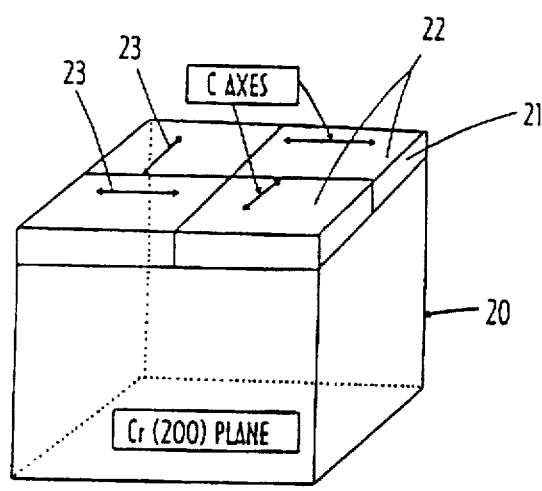
FIG. 2 schematically depicts a bicrystal cluster microstructure produced in accordance with the present invention.

The magnetic recording medium disclosed in copending application U.S. Ser. No. 08/586,571, the entire disclosure of which is incorporated herein by reference, exhibits dramatically reduced medium noise attributed to the formation of a magnetic alloy layer exhibiting a bicrystal cluster microstructure as shown in FIG. 2. With continued reference to FIG. 2, cobalt (Co)-based alloy 21 having a bicrystal cluster microstructure 22 is formed on a Cr underlayer 20 which exhibits a (200) crystallographic texture or orientation. Arrows 23 denote the C axes of the deposited Co-based alloy microstructure. The formation of an underlayer exhibiting a (200) crystallographic orientation enables the obtainment of a bicrystal cluster microstructure in a magnetic alloy layer epitaxially grown thereon.

Figure 3:
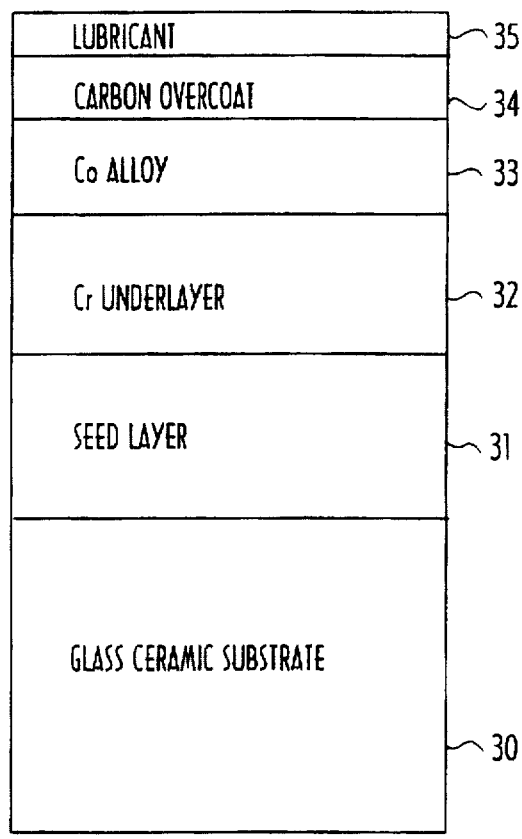
FIG. 3 schematically depicts a magnetic recording medium structure manufactured in accordance with an embodiment of the present invention.

The improved magnetic recording medium disclosed in copending application U.S. Ser. No. 08/586,571 is shown in FIG. 3 and comprises a substrate 30, such as a glass or glass-ceramic material, having a seed layer 31 thereon. The seed layer can comprise a material such as $Ni_3P$, NiP or tantalum (Ta). An underlayer 32, such as Cr, is formed on the seed layer and a magnetic alloy layer 33, such as a Co-based alloy, is deposited and epitaxially grown thereon. As in a conventional magnetic recording medium, an overcoat 34, such as carbon, and a lubricant 35 are sequentially deposited on the magnetic alloy layer. Seed layer 31 induces the underlayer deposited thereon to exhibit a (200) crystallographic orientation which, in turn, causes the magnetic alloy layer deposited and epitaxially grown thereon to exhibit a bicrystal cluster microstructure. In some of the disclosed embodiments, the seed layer is provided with a roughened surface to facilitate preferential alignment of the Cr underlayer to exhibit a (200) crystallographic orientation. In one of the disclosed embodiments, the seed layer is oxidized to provide a roughened surface.

The present invention is directed to a method of manufacturing a magnetic recording medium exhibiting low media noise and high coercivity, and comprising a magnetic alloy layer having a bicrystal cluster microstructure. The resulting magnetic recording medium comprises a surface-oxidized seed layer 31 as shown in FIG. 3. In accordance with the present invention, the seed layer, after deposition, is oxidized to provide an appropriate surface texture, whereby a subsequently deposited underlayer, such as Cr, exhibits a preferential (200) crystallographic orientation. Upon forming an underlayer with a (200) crystallographic texture, a magnetic alloy, such as a Co-based alloy, deposited and epitaxially grown thereon exhibits a bicrystal cluster microstructure, as shown in FIG. 2.

In an embodiment of the present invention, the seed layer, underlayer, magnetic layer and overcoat are sputter deposited in an in-line sputtering machine in which the seed layer is conveniently oxidized. Thus, the present invention can be practiced by modifying conventional sputtering systems to include, inter alia, means for oxidizing the deposited seed layer. In this way, the resulting low noise magnetic recording medium can be produced in an efficient manner without substantial modification of existing manufacturing procedures or equipment, or the need to acquire complex new equipment.

The substrate employed in the present process can comprise a glass or a glass-ceramic material. The seed layer can comprise $Ni_3P$, NiP or Ta, and can be sputter deposited in a thickness of about 200 Å to about 2000 Å, such as about 500 Å.

The underlayer can comprise Cr, a chromium-vanadium alloy (CRV) or a chromium-titanium alloy (CrTi), and can be sputter deposited in a thickness of about 100 Å to about 2000 Å, such as about 500 Å. The magnetic layer deposited on the underlayer can comprise any magnetic alloy suitable for use in a magnetic recording medium, such as a cobalt-based alloy. For example, the Co-based alloy can be a cobalt-chromium alloy (CoCr), a cobalt-chromium-tantalum alloy (CoCrTa), a cobalt-nickel-chromium alloy (CoNiCr), a cobalt-chromium-platinum-tantalum alloy (CoCrPtTa), a cobalt-chromium-platinum alloy (CoCrPt), a cobalt-nickel-platinum alloy (CoNiPt), a cobalt-nickel-chromium-platinum alloy (CoNiCrPt) or a cobalt-chromium-platinum-boron alloy (CoCrPtB). The magnetic alloy can be deposited in any convenient thickness, such as about 100 Å to about 1000 Å, about 200 Å to about 500 Å.

A protective overcoat can be deposited on the magnetic alloy layer, as by sputter deposition. The protective overcoat can comprise carbon, silicon-carbide (SIC), zirconium-oxide ($ZrO_2$), or a carbon-nitride (CN). The protective overcoat can be deposited at a thickness sufficient to provide the requisite protection of the underlying layers. A thickness of about 50 Å to about 300 Å, such as about 100 Å to about 200 Å, has been found adequate. A lubricant can be applied to the protective overcoat, at a thickness of about 5 Å to about 50 Å, such as about 10 Å to about 20 Å.

In an embodiment of the present invention, oxidation of the seed layer is conveniently conducted in an in-line sputtering system having an oxidation chamber. The underlayer, magnetic alloy layer and overcoat can be sputter deposited in a conventional manner. Thus, the present invention enables the manufacture of a magnetic recording medium comprising a magnetic layer having a bicrystal cluster microstructure on a glass or glass-ceramic substrate in an efficient and cost-effective manner.

Figure 4:
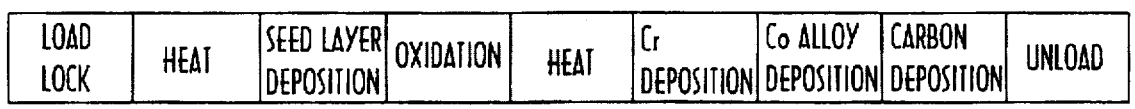
FIG. 4 illustrates a processing sequence in accordance with an embodiment of the present invention.

A processing sequence in accordance with an embodiment of the present invention is schematically shown in FIG. 4. With continued reference to FIG. 4, the substrate is loaded in the first stage of an in-line sputtering system, heated in a second stage, and a seed layer sputter deposited thereon in a third stage. After deposition of the seed layer, oxidation is conducted in a fourth stage. Subsequently, heating is conducted in a fifth stage, and a Cr underlayer is deposited in a sixth stage. The Cr underlayer exhibits a (200) crystallographic orientation which induces the Co-based alloy deposited thereon in a seventh stage to exhibit a bicrystal cluster microstructure. A protective carbon overcoat is deposited in an eighth stage and the resulting magnetic recording medium is unloaded in the ninth stage. The method can be continuously conducted, as by loading another substrate after a prior substrate is moved to the second stage for heating. In addition, a plurality of substrates can be simultaneously processed during each stage.

A sequence for oxidation in accordance with the embodiment depicted in FIG. 4 is set forth below.

Time 1: the entrance door of the oxidation chamber is opened and argon gas is supplied to the oxidation chamber.

Time 2: one or more the substrates arrive in the oxidation chamber.

Time 3: the door to the oxidation chamber is closed.

Time 4: the flow of argon to the oxidation chamber is discontinued.

Time 5: the oxidation chamber is evacuated.

Time 6: an oxidizing gas is introduced in to the oxidation chamber.

Time 7: oxidation is conducted in the oxidation chamber.

Time 8: the introduction of an oxidizing gas into the oxidation chamber is discontinued.

Time 9: the oxidation chamber is evacuated.

Time 10: argon is introduced into the oxidation chamber.

Time 11: the exit door of the oxidation chamber is opened.

Time 12: the substrates comprising an oxidized seed layer pass to the next chamber for heating.

Time 13: the exit door of the oxidation chamber is closed.

Time 14: the entrance door to the oxidation chamber is opened and one or more new substrates arrive.

The gas employed for oxidation can comprise any convenient oxidizing gas, such as air, oxygen, or a mixture of oxygen and argon. Suitable temperatures and times can be optimized in a particular situation. Suitable conditions include a temperature of about 20° C. to about 280° C., such as about 50° C. to about 250° C., for more than five seconds at about 0.1 m Torr to about 200 Torr of oxygen partial pressure. In an embodiment of the present invention, oxidation is conducted in a gaseous atmosphere comprising 20% by volume of oxygen with the balance argon, at a temperature of about 100° C., a pressure of about 10 m Torr for about one minute.

The present invention is not limited to the particular sequence of manipulative steps or oxidizing conditions exemplified herein. In accordance with the present invention, a method is provided to manufacture a magnetic recording medium comprising a magnetic layer exhibiting a bicrystal cluster microstructure with attendant significantly reduced medium noise. In accordance with the present invention, a magnetic recording medium having a signal-to-noise ratio in excess of 15 dB can be produced, including a magnetic recording medium having a signal-to-noise ratio in excess of 20 dB, measured at 127 KFCI (thousand flux reversals per inch). The present invention is applicable to the production of various types of magnetic recording media, particularly high density recording media, such as a thin film hard disk drive for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A method of manufacturing a magnetic recording medium, which method comprises:

depositing a seed layer on a substrate comprising a glass or a glass-ceramic material;

oxidizing the seed layer;

depositing an underlayer on the oxidized seed layer; and depositing a magnetic layer on the underlayer, wherein the deposited magnetic layer has a bicrystal cluster microstructure.

2. The method according to claim 1, wherein the magnetic recording medium is a thin film magnetic recording medium.

3. The method according to claim 1, comprising sputter depositing the seed layer.

4. The method according to claim 1, comprising sputter depositing the underlayer.

5. The method according to claim 1, comprising sputter depositing the magnetic layer.

6. The method according to claim 1, wherein the substrate has a surface average roughness Ra of about 2 Å to about 100 Å.

7. The method according to claim 6, wherein Ra is about 5 Å to about 20 Å.

8. The method according to claim 1, comprising sputter depositing a seed layer containing a material selected from the group consisting of $Ni_3P$, NiP and Ta.

9. The method according to claim 8, wherein the thickness of the seed layer is about 200 Å to about 2000 Å.

10. The method according to claim 9, wherein the thickness of the seed layer is about 500 Å.

11. The method according to claim 1, comprising oxidizing the seed layer in an atmosphere of air or a mixture of argon and oxygen at an oxygen pressure of about 0.1 m Torr to about 200 Torr.

12. The method according to claim 11, wherein the seed layer is oxidized at a temperature of about 20° C. to about 280° C.

13. The method according to claim 12, wherein the seed layer is oxidized for more than about five seconds.

14. The method according to claim 13, wherein the seed layer is oxidized for up to about one minute.

15. The method according to claim 12, wherein oxidation results in an induced surface roughness having a Rp-v (peak-to-valley roughness) of about 10 Å to about 100 Å.

16. The method according to claim 1, comprising depositing an underlayer containing Cr, CrV or CrTi.

17. The method according to claim 16, wherein the thickness of the underlayer is about 100 Å to about 2000 Å.

18. The method according to claim 17, wherein the thickness of the underlayer is about 500 Å.

19. The method according to claim 1, comprising depositing a magnetic layer comprising a Co-based alloy.

20. The method according to claim 19, wherein the Co-based alloy is selected from the group consisting of CoCr, CoCrTa, CoNiCr, CoCrPtTa, CoCrPt, CoNiPt, CoNiCrPt and CoCrPtB.

21. The method according to claim 20, wherein the thickness of the Co-based magnetic alloy is about 100 Å to about 1000 Å.

22. The method according to claim 21, wherein the thickness of the Co-based magnetic alloy is about 200 Å to about 500 Å.

23. The method according to claim 1, further comprising depositing an overcoat, about 50 Å to about 300 Å, on the magnetic layer.

24. The method according to claim 23, wherein the thickness of the overcoat is about 100 Å to about 200 Å.

25. The method according to claim 23, wherein the overcoat comprises carbon, SiC, $ZrO_2$ or a CN.

26. The method according to claim 23, further comprising depositing a lubricant, having a thickness of about 5 Å to about 50 Å, on the overcoat.

27. The method according to claim 26, wherein the lubricant has a thickness of about 10 Å to about 20 Å.

28. The method according to claim 1, wherein the deposited seed layer has a thickness of about 200 Å to about 2000 Å.

* * * * *